United States Patent
Shimoda et al.

(10) Patent No.: US 8,235,315 B2
(45) Date of Patent: Aug. 7, 2012

(54) METHOD FOR PRODUCING HYDRAULIC POWDER

(75) Inventors: Masaaki Shimoda, Wakayama (JP);
Masafumi Shonaka, Shanghai (CN);
Toshimasa Hamai, Wakayama (JP);
Kenichi Kobata, Chiba (JP)

(73) Assignee: Kao Corporation, Tokyo (JP)

( * ) Notice: Subject to any disclaimer, the term of this patent is extended or adjusted under 35 U.S.C. 154(b) by 279 days.

(21) Appl. No.: 12/667,376

(22) PCT Filed: Aug. 7, 2008

(86) PCT No.: PCT/JP2008/064565
§ 371 (c)(1),
(2), (4) Date: Mar. 4, 2010

(87) PCT Pub. No.: WO2009/022717
PCT Pub. Date: Feb. 19, 2009

(65) Prior Publication Data
US 2010/0319587 A1    Dec. 23, 2010

(30) Foreign Application Priority Data

Aug. 10, 2007 (JP) .................. 2007-210156

(51) Int. Cl.
*B02C 19/00* (2006.01)
(52) U.S. Cl. ........................................ 241/16
(58) Field of Classification Search ............ 241/16, 241/22
See application file for complete search history.

(56) References Cited

U.S. PATENT DOCUMENTS

| 3,615,785 A | 10/1971 | Moorer et al. |
| 2006/0169177 A1 | 8/2006 | Jardine et al. |

FOREIGN PATENT DOCUMENTS

| JP | 48-42697 B1 | 12/1973 |
| JP | 54-43188 A | 4/1979 |
| JP | 57-88046 A | 6/1982 |
| JP | 57-100952 A | 6/1982 |
| JP | 59-78961 A | 5/1984 |
| JP | 62-87441 A | 4/1987 |
| JP | 3-187958 A | 8/1991 |
| JP | 5-147984 A | 6/1993 |
| JP | 7-33487 A | 2/1995 |
| JP | 11-60298 A | 3/1999 |
| JP | 11-157891 A | 6/1999 |
| JP | 11-322380 A | 11/1999 |
| JP | 2980752 B2 | 11/1999 |
| JP | 2001-58855 A | 3/2001 |
| JP | 2002-160959 A | 6/2002 |
| JP | 2005-89287 A | 4/2005 |
| WO | 2005/076858 A1 | 8/2005 |

OTHER PUBLICATIONS

English translation of the Abstract of CN-A 85 104 833 (Jan. 7, 1987).

*Primary Examiner* — Mark Rosenbaum
(74) *Attorney, Agent, or Firm* — Birch, Stewart, Kolasch & Birch, LLP

(57) ABSTRACT

According to the present invention, a hydraulic powder is prepared by including a step of grinding a hydraulic compound in the presence of (A) glycerin and (B) polyethyleneglycol that are present in a fixed weight ratio.

5 Claims, No Drawings

METHOD FOR PRODUCING HYDRAULIC POWDER

FIELD OF THE INVENTION

The present invention relates to a method for preparing a hydraulic powder.

BACKGROUND OF THE INVENTION

Hydraulic compound, for example, Portland cement clinker and blast-furnace slag and the like are ground to give various types of hydraulic powder. For instances, Portland cement is produced by calcining raw materials such as limestone or clay, iron scraps to obtain clinker, adding an appropriate amount of gypsum to clinker and grinding the mixture. In this case, in order to increase efficiency for grinding, a grinding aid such as diethylene glycol or triethanolamine is used. For a grinding process, it is desirable that hydraulic compounds are prepared as efficiently and quickly as possible in a desired particle size. For such reasons, a grinding aid has been used for a conventional grinding process.

With respect to a grinding aid, oligomers of lower alkyleneglycol such as propyleneglycol or diethyleneglycol (for example, see JP-A7-33487, JP-A11-157891 and JP-A11-322380), alkanolamines such as triethanolamine (for example, see JP-A2002-160959), fatty acids such as stearic acid or aromatic compounds such as phenol (for example, see JP-A5-147984), and hydroxyalkylhydrazine or tertiary butyl acetic acid and the like (for example, see JP-A11-60298) are known. In addition, it has been also known that glycerin is used as a grinding aid (for example, see JP-A5-147984 and JP-A11-60298), lignin sulfonic acid salt is used in combination with glycerin (for example, see, JP-A57-100952), and organic plant wastewater including polyhydric alcohols is used (for example, see JP-A2005-89287). In particular, it is known that diethyleneglycol or triethanolamine has a good grinding efficiency and also can be prepared in a desired particle size at a relatively high speed.

Meanwhile, there is a problem of quality deterioration due to decreased strength of cement, depending on conditions for production and preservation thereof. The reason for such decrease of strength includes degradation of cement that is caused by moisture released from binding water of dihydrate gypsum included in cement when the cement is stored in a silo or etc. at a high temperature, or weathering of cement caused by moisture contained in air when the cement is transferred with air. As a means to cope with such problems, it is described as an effective method in JP-A 3-187958 that silicone oil is added for grinding and manufacturing cement.

SUMMARY OF THE INVENTION

The present invention relates to a method for preparing a hydraulic compound, including a step of grinding a hydraulic compound in the presence of (A) glycerin and (B) polyethyleneglycol in a weight ratio of (A)/(B)=9/1 to 5/5.

Further, the present invention relates to a grinding aid which contains (A) glycerin (hereinafter, referred to as component (A)) and (B) polyethyleneglycol (hereinafter, referred to as component (B)) in a weight ratio of (A)/(B)=9/1 to 5/5.

Still further, the present invention relates to a hydraulic powder obtained by the preparation method of the present invention.

DETAILED DESCRIPTION OF THE INVENTION

Diethyleneglycol, which is widely used as a grinding aid for hydraulic compounds, has a problem in that its quality can be deteriorated by weathering (see, JP-A3-187958).

Meanwhile, glycerin, which has been long known as a grinding aid for hydraulic compounds (see, JP-A5-147984 and JP-A11-60298), has high liquid viscosity so that the handling property and initial grinding efficiency tend to be poor.

In addition, silicone oil, that is believed to be capable of inhibiting a reduction in strength of cement due to deterioration, is known to form an oil film on the surface of cement particles to exhibit a water-repellant effect. As such, there is a concern regarding its influence on a hydration reaction of cement particles, especially its influence on a curing time for exhibiting an initial hydration reaction. In addition, since an oily material such as silicone oil has an anti-foaming effect, it is expected that the preparation of a hydraulic composition including air such as air bubble mortar or AE concrete is difficult.

The present invention provides a method for preparing a hydraulic powder to reduce time for obtaining a desired particle size with a good grinding efficiency and produce a hydraulic powder, such as cement, being suppressed from strength's reduction due to deterioration.

According to the present invention, a method for preparing a hydraulic powder, which can reduce time for obtaining a desired particle size with a good grinding efficiency, and can produce a hydraulic powder, such as cement, being suppressed from strength's reduction due to deterioration.

The hydraulic compound of the present invention includes a material which has a curing property with reaction with water and a compound which has no curing property by itself. It also includes, when two or more kinds are used in combination, a compound which can form a hydrate based on an interaction between the two or more kinds through water and be cured.

Generally, when a hydraulic compound, for example cement clinker, is ground, intercrystalline fracture and transcrystalline fracture can occur. In case of transcrystalline fracture, an ionic bond between Ca—O is broken so that a surface carrying excessive cations ($Ca^{2+}$) and a surface carrying excessive anions ($O^{2-}$) are produced. In addition, a distance that is under the influence of an electrostatic force is shortened due to an impact by a grinder to yield agglomeration. As a result, grinding efficiency becomes lowered. It is considered that a grinding aid increases grinding efficiency by reducing surface energy of fractured surface of particles to suppress agglomeration.

According to the present invention, by using glycerin and a compound having a glycol structure in a specific ratio, liquid viscosity as a grinding aid is lowered and it can be more quickly and homogeneously adhered to the to-be-ground materials. As a result, it is estimated that a desired particle size can be obtained at a relatively fast speed. The invention contains glycerin having a large solidifying point-depression. It is estimated that, even in a case component (B) agglomerates by itself at room temperature, the grinding aid of the present invention remains as liquid, including both glycerin and component (B), and therefore not only the handling becomes easier, but also the spreadability over the surface of powder becomes better, which leads to an increase in grinding efficiency.

Further, by grinding hydraulic compounds in the presence of polyethyleneglycol having a water-retaining property, it is estimated that polyethylene glycol is efficiently incorporated so that the degradation of the hydraulic compounds is suppressed and also the strength reduction of the hydraulic powder due to weathering can be suppressed.

With respect to polyethyleneglycol as component (B), its weight average molecular weight is preferably 400 to 1,200.

The weight average molecular weight is measured by GPC (gel permeation chromatography). Weight average molecular weight of PEG is preferably 400 or more in terms of suppression of deterioration of the hydraulic powder by retained water. Further, it is preferably 1,200 or less in terms of handling problem caused by agglomeration or an increase in viscosity. Consequently, in terms of inhibiting deterioration of the hydraulic powder and agglomeration, it is preferably 400 to 1,200, and more preferably 500 to 1,000.

Portland cement is typically prepared as a powder having specific surface area, i.e., Blaine value, of 2,500 $cm^2/g$ or more, which is produced by pre-grinding clinker (also referred to as cement clinker, and sometimes gypsum is included therein), that is a hydraulic compound obtainable from calcination of raw materials such as limestone, clay or metal scraps, adding an appropriate amount of gypsum and grinding for finishing. Component (A) and component (B) of the present invention are used as a grinding aid for the grinding, or preferably as a grinding aid for finishing grinding. According to the present invention, grinding of hydraulic compound is carried out in the presence of component (A) and component (B) that are present in weight ratio of (A)/(B)=9/1 to 5/5, preferably 8/2 to 5/5. Further, it is preferable to have component (A) and component (B) in their total amount of 0.001 to 0.2 parts by weight, or more preferably 0.005 to 0.1 parts by weight to 100 parts by weight of a hydraulic compound, especially cement clinker, to obtain fast grinding with desired particle size. Grinding of a hydraulic compound, especially clinker, more especially the finishing grinding, is preferably carried out by adding component (A) and component (B) in a fixed weight ratio to raw materials including a hydraulic compound, especially clinker. The addition method includes dropping or drizzling a liquid mixture including component (A) and component (B) or a liquid mixture including component (A), component (B) and other components.

In the present invention, component (A) and component (B) are preferably used in a form of a liquid mixture which has component (A) and component (B). In addition, in terms of a handling property, it is preferable that the liquid mixture has viscosity of 1,000 mPa·s or less at 20° C. The viscosity is measured by using VISCOMETER (BM type; manufactured by Tokyo Keiki Kogyo Co., Ltd.) under the temperature condition of 18 to 22° C. Further, in terms of easy handling, the liquid mixture can be used as an aqueous solution. The total concentration of component (A) and component (B) in an aqueous solution is preferably 50 to 99% by weight. Using an aqueous solution including component (A) and component (B) is so important that it can facilitate a quick and homogeneous spread of component (A) and component (B) over a hydraulic compound. When, on the other hand, the aqueous solution is in contact with a hydraulic compound, the water included in the aqueous solution is quickly absorbed by or react with the hydraulic compound so that component (A) and component (B) is concentrated at a relatively early stage of grinding. The resulting total concentration of component (A) and component (B) becomes almost 100% and the grinding proceeds with the hydraulic compound. For such reasons, it is extremely important for a liquid mixture including component (A) and component (B) itself to have a low viscosity in order to obtain an effect of grinding. In this connection, a single grinding aid, such as glycerin which has a high intrinsic viscosity in itself, is not suitable for obtaining an improvement in grinding efficiency in an industrial equipment.

According to the present invention, it is preferable that, together with component (A) and component (B), compound (C) that is obtained by adding alkyleneoxide having 2 to 4 carbon atoms to glycerin (hereinafter, referred to as component (C)) is further present for carrying out grinding of a hydraulic compound. With respect to component (C), ethyleneoxide (hereinafter, described as EO) and/or propyleneoxide (herein after, described as PO) adduct of glycerin is preferred. When there are two or more of alkyleneoxides, it can have a block type or a random type. Among the alkyleneoxide adducts of glycerin, compound (C1) that is obtained by adding on average 0.5 to 6 moles of alkyleneoxide having 2 to 4 carbon atoms to glycerin is preferred. The average added mole number of alkyleneoxide in compound (C1) is 1 to 5, more preferably 1 to 4. With respect to compound (C1), alkyleneoxide is preferably EO and/or PO. The average added mole number of EO and/or PO is 0.5 to 6 moles, preferably 1 to 5 moles, and more preferably 1 to 4 moles per one mole of glycerin. With respect to compound (C1), the compounds that are obtained by adding EO in an average amount of 0.5 to 6 moles, preferably 1 to 5 moles, and more preferably 1 to 4 moles are preferred.

According to the present invention, conditions for grinding can be adjusted to obtain powder having an appropriate particle size depending on raw materials, use and the like. In general, it is preferable that a hydraulic compound, especially clinker, is ground until it becomes powder to have specific surface area, i.e., Blaine value, of 2,500 to 5,000 $cm^2/g$.

In the present invention, a grinding apparatus that can be used for grinding a hydraulic compound, particularly clinker, more particularly for finishing grinding is not specifically limited. However, example thereof includes a ball mill which is generally used for grinding cement and the like. The material for grinding mediums of the apparatus (grinding ball) desirably has hardness that is the same or more than that of a material to be ground (for example, calcium aluminate for cement clinker). Commercially available product includes, for instances, steel, alumina, zirconia, titania and tungsten carbide.

According to the present invention, a grinding aid for hydraulic compounds, wherein component (A) and component (B) are included in a weight ratio of (A)/(B)=9/1 to 5/5, is provided. That is, a method for the grinding of hydraulic compound, especially clinker, by using a grinding including component (A) and component (B) in a weight ratio of (A)/(B)=9/1 to 5/5 for grinding hydraulic compound, especially clinker, more especially for the finishing grinding, is provided. In this case, it is preferable that component (A) is used in an amount of 0.001 to 0.1 parts by weight and component (B) is used in an amount of 0.001 to 0.1 parts by weight in a grinding aid to 100 parts by weight of hydraulic compound, especially cement clinker.

The hydraulic powder that is obtained by the preparation method of the present invention is suppressed from strength reduction caused by deterioration. The hydraulic powder includes, Portland cement, blast-furnace slag, alumina cement, fly ash, limestone, and gypsum. The hydraulic compound that is subjected to grinding is a raw material for these hydraulic powders.

EXAMPLES

Hereinbelow, the embodiments of the present invention are described with reference to the following examples. However, it is evident that the examples are to be considered as an exemplification only and are not intended to limit the present invention.

Example 1 and Comparative Example 1

Used materials as described below are prepared in a blending quantity as described below and added at once, and then ground by ball mill. In this case, grinding efficiency (initial grindability and time to reach ground state) and strength test of thus-obtained cement were evaluated as described below. Results are given in Table 1.

(1-1) Used Materials

Clinker: Clinker for general Portland cement, obtained by combining limestone, clay, silicate, iron oxide raw materials and the like to have composition of CaO: about 65%, $SiO_2$: about 22%, $Al_2O_3$: about 5%, $Fe_2O_3$: about 3%, MgO and others: about 3% (based on weight), calcining, and grinding them first by using a crasher and a grinder Dihydrate gypsum: Dihydrate gypsum having $SO_3$ in an amount of 44.13%

Grinding aid: see, Table 1

(1-2) Blending Quantity

Clinker: 1,000 g

Dihydrate gypsum: 38.5 g, the amount of added $SO_3$ was adjusted to 1.7% (1,000 g×1.7%/44.13%=38.5 g)

Grinding aid: Compound of Table 1 was used as 50% by weight aqueous solution (1-3) Ball Mill AXB-15 manufactured by SEIWA GIKEN Co., Ltd. was used. Ceramic pot volume was 15 liter (outer diameter 300 mm) and zirconia ball in total weight of 10.2 kg was used (38 mmΦ, 6.8 kg; 32 mmΦ, 2.2 kg and; 30 mmΦ, 1.3 kg). Revolution number of the ball mill was 38 rpm. In addition, time for releasing ground materials during grinding process was adjusted to 1 minute.

(1-4) Initial Grindability

In terms of predicting grinding efficiency for a scale-up process at an industrial production level, etc., Blaine value was determined 30 minutes after starting the grinding. For a large scale grinding such as industrial production, it is important that a grinding aid is quickly and homogeneously spread over the surface of to-be-ground materials (clinker, etc.) while wetting them. Blaine values that are measured very shortly after the start of grinding at laboratory scale serves as a yardstick for a wetting and spreading property of a grinding aid. As a result, from such values it is possible to predict grinding efficiency at an industrial equipment level. For the measurement of Blaine value, the apparatus for Blaine air penetration, that is designated by a physical method for testing cement (JIS R 5201), was used. Regarding the evaluation, when Blain value after 30 min is more than 1,340 $cm^2/g$, it is indicated as ⦿, ○ is for the value more than 1,320 $cm^2/g$ to 1,340 $cm^2/g$ or less, Δ is for the value more than 1,300 $cm^2/g$ to 1,320 $cm^2/g$ or less, and x is for the value 1,300 $cm^2/g$ or less.

(1-5) Time to Reach Ground State

Target Blaine value was 3,300±100 $cm^2/g$, and 30 min, 45 min, 60 min, 75 min, and 90 min after the start of grinding Blaine value was measured. Then, time required for reaching target Blaine value of 3,300 $cm^2/g$ was obtained by secondary regression equation and it was defined as a final reaching time (time to reach ground state). In addition, for the measurement of Blaine value, the apparatus for Blaine air penetration, that is designated by a physical method for testing cement (JIS R 5201), was used. The difference among the time to reach ground state obtained from this test is more significant at an industrial equipment level. The evaluation was carried out by obtaining relative values compared to the time to reach ground state in Comparative Example 1-1 that had been standardized to 100. When relative value was 90 or less, it is indicated as ⦿, similarly, ○ is for the value more than 90 to 95, Δ is for the value more than 95 to 98, and x is for the value more than 98. According to the evaluation, the time to reach ground state was 114 min for Comparative Example 1-1. Comparative Example 1-1 was described as a 'standard' in Table 1.

(6) Strength Test

Strength test was carried out in accordance with a physical method for testing cement (JIS R 5201) appendix 2 (Method for testing cement—Measurement of strength). The used cement was the one obtained above having Blaine value of 3,300±100 $cm^2/g$. The evaluation was carried out by obtaining relative values compared to the compressive strength in Comparative Example 1-1 that had been standardized to 100. When relative value was the value 90 or less, it is indicated as x, similarly, ○ is for the value more than 90 to 110 or less, and ⦿ is for the value more than 110. According to the evaluation, compressive strength obtained for Comparative Example 1-1 was 30.6 $N/mm^2$ and 44.1 $N/mm^2$ after three days and seven days, respectively. Comparative Example 1-1 was described as a 'standard' in Table 1.

(7) Deterioration Test for Cement

In order to evaluate an suppressing effect on cement deterioration, cements that had been obtained from some of Examples and Comparative Examples were sealed in a heat-proof glass vessel and stored in an incubator at 70° C. for 6 days. Mortar compressive strength was measured for the cement before and after the storage in accordance with a physical method for testing cement (JIS R 5201) appendix 2 (Method for testing cement—Measurement of strength). Meanwhile, considering a state of a storage silo, the condition for sealing was adjusted so that cement can be easily weathered by moisture released from binding water of dihydrate gypsum which is included in cement. Results are given in Table 1. The evaluation was based on the rate of reduction of the compressive strength that has been obtained from the deterioration test before and after the storage. When the rate of reduction was 6% or less, it is indicated as ⦿, ○ is for the rate more than 6 to 12%, and x is for the rate more than 12%.

TABLE 1

| | | Grinding aid | | | Initial grindability | Time to reach ground state | Compressive strength | | After the storing at 70° C. (degradation) | |
|---|---|---|---|---|---|---|---|---|---|---|
| | | Kind | Added amount (wt %) | Viscosity | Blaine value after grinding for 30 minutes | Time to reach 3300 $cm^2/g$ | Before the storing | | | |
| | | | | | | | After 3 days | After 7 days | After 3 days | After 7 days |
| Comparative example | 1-1 | — | — | — | X | Standard | Standard | Standard | ○ | X |
| | 1-2 | Diethyleneglycol | 0.04 | ○ | ○ | ○ | ⦿ | ○ | ○ | X |
| | 1-3 | Glycerin | 0.04 | X | Δ | ○ | ○ | ○ | ○ | ○ |
| | 1-4 | PEG600 | 0.04 | X | ○ | ○ | ○ | ○ | ⦿ | ⦿ |
| Example | 1-1 | Glycerin/PEG600 = 70/30 (weight ratio) | 0.04 | ○ | ○ | ○ | ⦿ | ○ | — | — |

TABLE 1-continued

| Grinding aid | | | Initial grindability | Time to reach ground state | Compressive strength | | | |
|---|---|---|---|---|---|---|---|---|
| | | | | | Before the storing | | After the storing at 70° C. (degradation) | |
| Kind | Added amount (wt %) | Viscosity | Blaine value after grinding for 30 minutes | Time to reach 3300 cm²/g | After 3 days | After 7 days | After 3 days | After 7 days |
| 1-2 Glycerin/PEG600 = 50/50 (weight ratio) | 0.04 | ◯ | ◉ | ◯ | ◯ | ◯ | ◉ | ◯ |
| 1-3 Glycerin/diethyleneglycol = 50/50 (weight ratio) | 0.04 | ◯ | ◉ | ◯ | ◉ | ◉ | — | — |

In the Table, for Comparative Example 1-1 only water was added in an amount of 0.04% by weight compared to clinker weight. In addition, PEG600 means polyethyleneglycol having a weight average molecular weight of 600. In the table, the additive amount indicates an amount of a compound in % by weight compared to clinker.

With respect to the viscosity described in the table, it was measured for the material (100% product) in terms of easy handling and grinding efficiency resulting from diffusivity when the process is scaled-up. When the viscosity is 1,000 mPa·s or less, it is indicated as [◯]. When the viscosity is more than 1,000 mPa·s or in an agglomeration state, it is indicated as [x]. Conditions for measuring viscosity are the same as those described above.

From the results shown in Table 1, it has been found that, by combining glycerin which greatly lowers the solidifying point with polyethyleneglycol which has a high water-retaining property, the grinding aid which can be handled easily without agglomeration, has a good grinding efficiency and also is useful for suppressing the strength reduction due to deterioration can be obtained.

Example 2 and Comparative Example 2

Materials as described below are prepared in a blending quantity as described below and added at once, and then ground by ball mill for finishing grinding. In this case, grinding efficiency (initial grindability and time to reach ground state) and strength test of thus-obtained cement were evaluated as described below. Results are given in Table 2.

(2-1) Used Materials

It is the same as those of Example 1 and Comparative Example 1.

(2-2) Blending Quantity

It is the same as those of Example 1 and Comparative Example 1.

(2-3) Ball Mill

AXB-15 manufactured by SEIWA GIKEN Co., Ltd. was used. Ceramic pot volume was 18 liter (outer diameter 300 mm) and stainless balls in total number of 140 were used (70 balls having diameter of 30 mmΦ: nominal outside diameter 1 3/16, and 70 balls having diameter of 20 mmΦ: nominal outside diameter 3/4). Revolution number of the ball mill was 45 rpm. In addition, time for releasing ground materials during grinding process was adjusted to 1 minute.

(2-4) Initial Grindability

For the measurement of Blaine value, the apparatus for Blaine air penetration, that is designated by a physical method for testing cement (JIS R 5201), was used. Regarding the evaluation, when Blain value after 60 min is more than 2,400 cm²/g, it is indicated as [◉], ◯ is for the value more than 2,300 cm²/g to 2,400 cm²/g or less, [Δ] is for the value more than 2,200 cm²/g to 2,300 cm²/g or less, and [x] is for the value the same of 2,200 cm²/g or less.

(2-5) Time to Reach Ground State

Target Blaine value was 3,300±100 cm²/g, and 60 min, 75 min, and 90 min after the start of grinding Blaine value was measured. Then, time required for reaching target Blaine value of 3,300 cm²/g was obtained by secondary regression equation and it was defined as a final reaching time (time to reach ground state). In addition, for the measurement of Blaine value, the apparatus for Blaine air penetration, that is designated by a physical method for testing cement (JIS R 5201), was used. The difference among the time to reach ground state obtained from this test is more significant at an industrial equipment level. The evaluation was carried out by obtaining relative values compared to the time to reach ground state in Comparative Example 2-1 that had been standardized to 100. When relative value was 90 or less, it is indicated as [◯], and the value was more than 90 it is indicated as [x]. According to the evaluation, the time to reach ground state was 124 min for Comparative Example 2-1. Comparative Example 2-1 was described as a 'standard' in Table 2.

(2-6) Strength Test

Strength test was carried out in accordance with a physical method for testing cement (JIS R 5201) appendix 2 (Method for testing cement—Measurement of strength). The used cement was the one obtained above having Blaine value of 3,300±100 cm²/g. The evaluation was carried out by obtaining relative values compared to the compressive strength in Comparative 2-1 that had been standardized to 100. When relative value was more than 110, it is indicated as [◉], similarly, [◯] is for the value more than 90 to 110, and [x] is for the value 90 or less. According to the evaluation, compressive strength obtained for Comparative Example 2-1 was 29.9N/mm² and 44.2/mm² after three days and seven days, respectively. Comparative Example 2-1 was described as a 'standard' in Table 2.

(2-7) Deterioration Test for Cement

It is the same as those of Example 1 and Comparative Example 1.

TABLE 2

| | | Grinding aid | | | | Initial grindability Blaine value after grinding for 60 minutes | Time to reach ground state Time to reach 3300 cm²/g | Compressive strength | | Compressive strength after storing at 70° C. | |
|---|---|---|---|---|---|---|---|---|---|---|---|
| | | Kind | Added amount (wt %) | Safety | Viscosity | | | After 3 days | After 7 days | After 3 days | After 7 days |
| Comparative example | 2-1 | — | — | — | — | X | Standard | Standard | Standard | ○ | X |
| | 2-2 | Diethyleneglycol | 0.04 | X | ○ | ◎ | ○ | ◎ | ○ | ○ | X |
| | 2-3 | Glycerin | 0.04 | ○ | X | △ | ○ | ○ | ○ | ○ | ○ |
| | 2-4 | PEG600 | 0.04 | ○ | X | ○ | X | ○ | ○ | ◎ | ◎ |
| | 2-5 | Glycerin/diethylenglycol = 40/60 (weight ratio) | 0.04 | ○ | ○ | ◎ | ○ | ○ | ○ | ○ | X |
| | 2-6 | Glycerin/PEG600 = 40/60 (weight ratio) | 0.04 | ○ | ○ | ○ | X | ○ | ○ | ◎ | ◎ |
| Example | 2-1 | Glycerin/PEG600 = 85/15 (weight ratio) | 0.04 | ○ | ○ | ○ | ○ | ◎ | ◎ | ◎ | ◎ |
| | 2-2 | glycerin/PEG600 = 70/30 (weight ratio) | 0.04 | ○ | ○ | ○ | ○ | ◎ | ○ | ◎ | ◎ |
| | 2-3 | glycerin/PEG600 = 50/50 (weight ratio) | 0.04 | ○ | ○ | ○ | ○ | ○ | ○ | ◎ | ◎ |
| | 2-4 | Glycerin/diethyleneglycol = 85/15 (weight ratio) | 0.04 | ○ | ○ | ○ | ○ | ○ | ○ | ◎ | ○ |
| | 2-5 | Glycerin/diethyleneglycol = 70/30 (weight ratio) | 0.04 | ○ | ○ | ○ | ○ | ◎ | ◎ | ○ | ○ |
| | 2-6 | Glycerin/diethyleneglycol = 50/50 (weight ratio) | 0.04 | ○ | ○ | ○ | ○ | ◎ | ◎ | ○ | ○ |
| | 2-7 | Glycerin EO adduct/glycerin/diethyleneglycol = 30/49/21 (weight ratio) | 0.04 | ○ | ○ | ○ | ○ | ◎ | ◎ | ◎ | ○ |
| | 2-8 | Glycerin EO adduct/glycerin/diethyleneglycol = 50/35/15 (weight ratio) | 0.04 | ○ | ○ | ◎ | ○ | ◎ | ◎ | ◎ | ◎ |

In the table, glycerin EO adduct means a glycerin adduct with an average of 1 mole EO.

The invention claimed is:

1. A method for preparing a hydraulic powder, comprising a step of grinding a hydraulic compound in the presence of (A) glycerin and (B) polyethyleneglycol in a weight ratio of (A)/(B)=9/1 to 5/5.

2. The method for preparing a hydraulic powder according to claim 1, wherein (A) and (B) are used in the total amount of 0.001 to 0.2 parts by weight to 100 parts by weight of the hydraulic compound.

3. The method for preparing a hydraulic powder according to claim 1 or 2, wherein (A) is used in an amount of 0.001 to 0.1 parts by weight and (B) is used in an amount of 0.001 to 0.1 parts by weight, to 100 parts by weight of the hydraulic compound.

4. The method for preparing a hydraulic powder according to any one of claim 1 or 2, wherein compound (C) obtained by adding alkyleneoxide having 2 to 4 carbon atoms to glycerin is further present for carrying out the grinding of a hydraulic compound.

5. The method for preparing a hydraulic powder according to claim 1 or 2, wherein (A) is used in an amount of 0.001 to 0.1 parts by weight and (B) is used in an amount of 0.001 to 0.1 parts by weight, to 100 parts by weight of the hydraulic compound and then compound (C) obtained by adding alkyleneoxide having 2 to 4 carbon atoms to glycerin is further present for carrying out the grinding of a hydraulic compound.

\* \* \* \* \*